Dec. 6, 1960   E. J. MARAK ET AL   2,962,926
NEPHELOMETER
Filed June 4, 1956   6 Sheets-Sheet 5

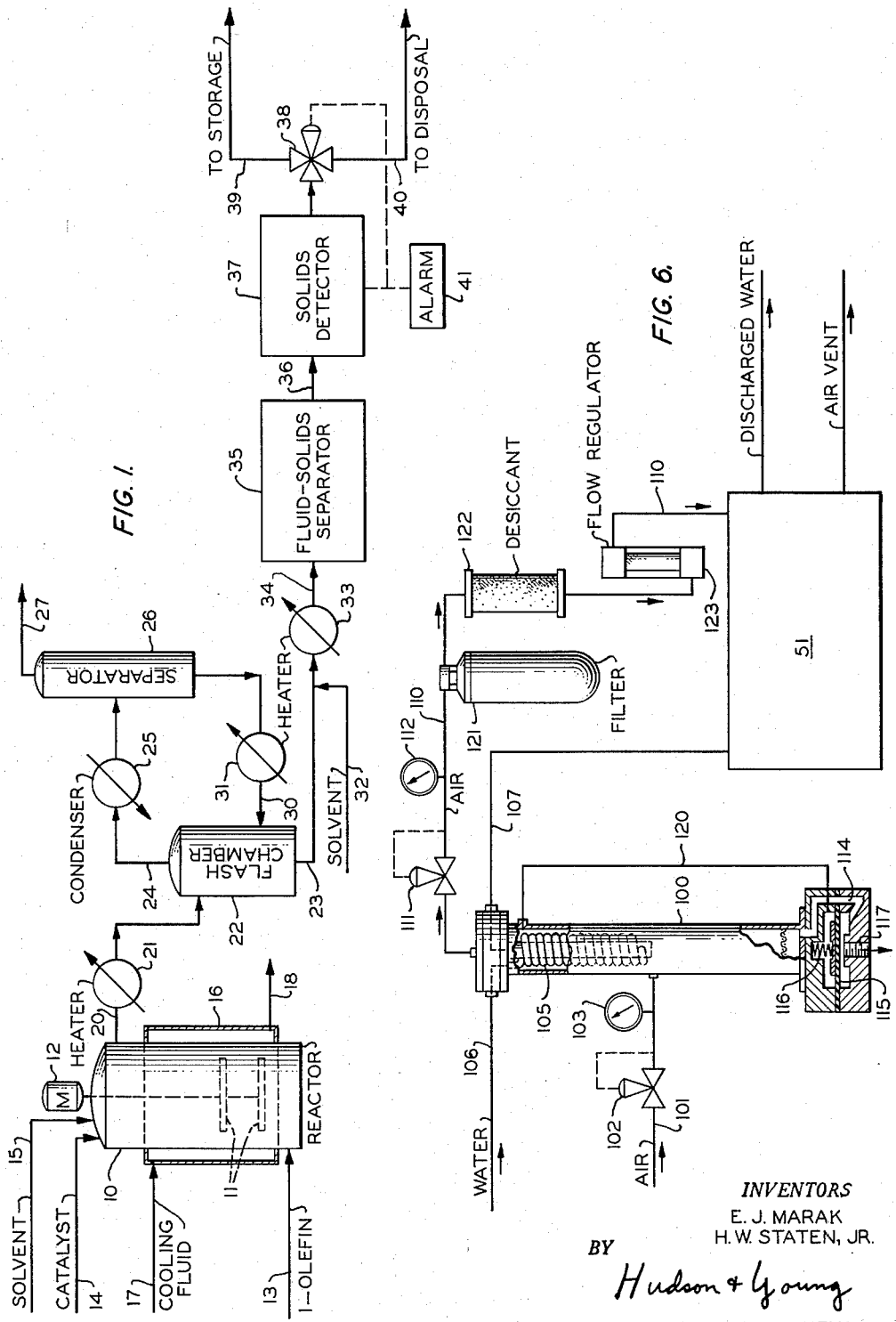

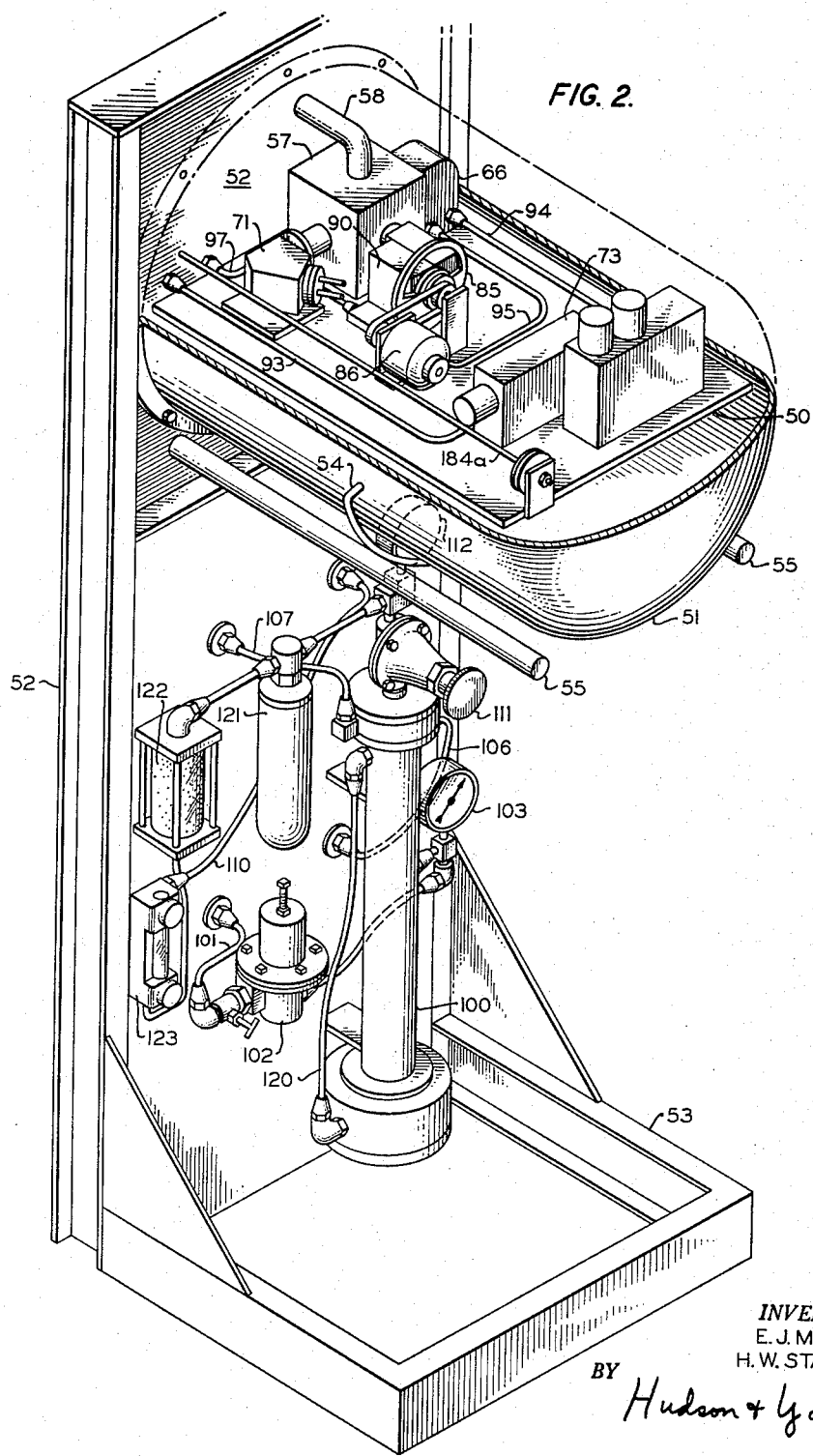

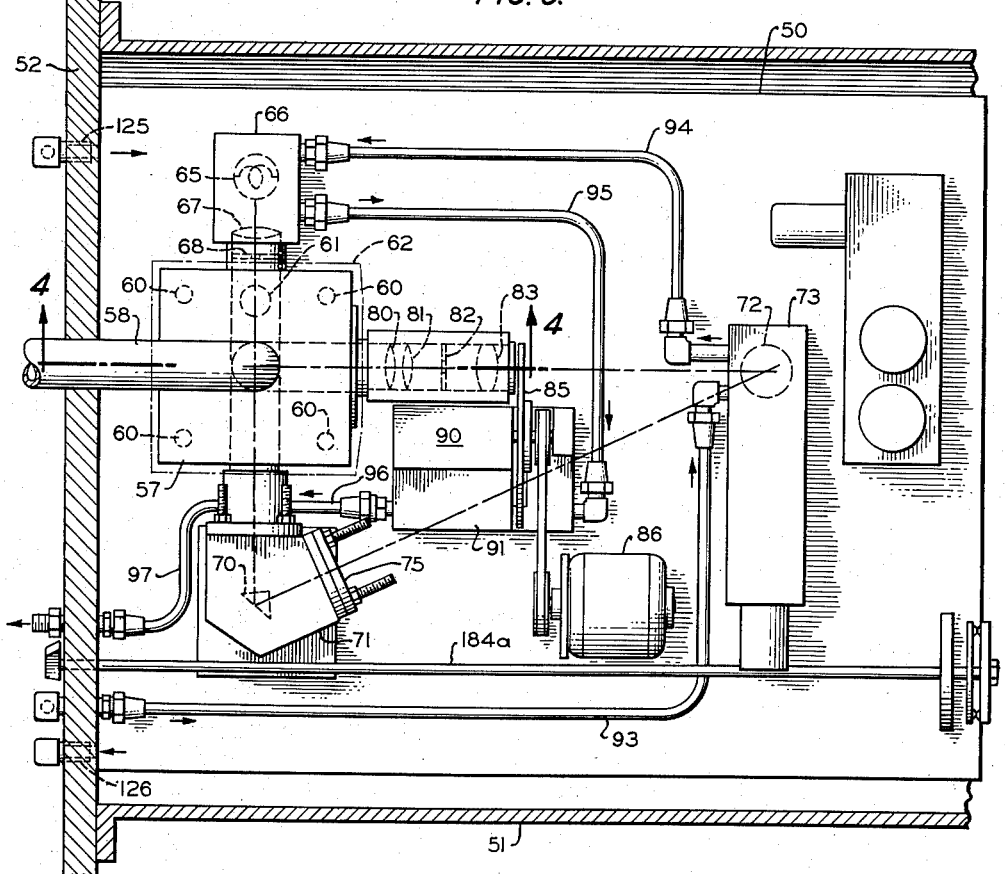
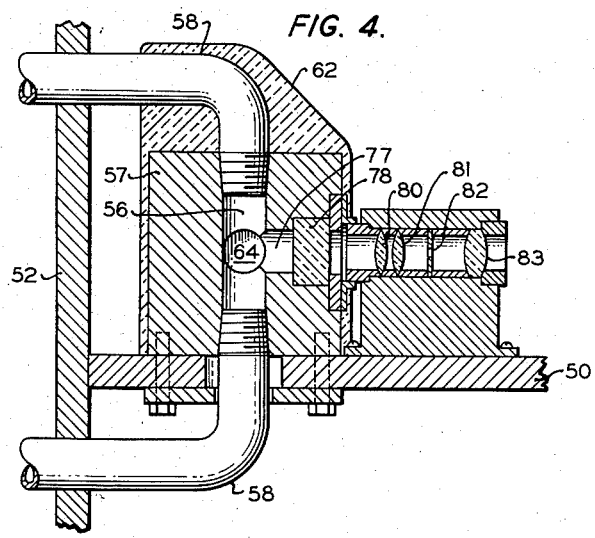
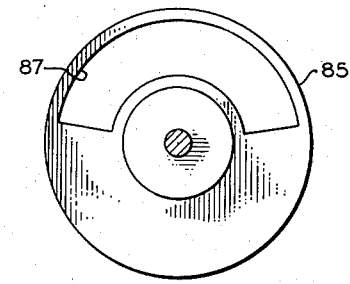

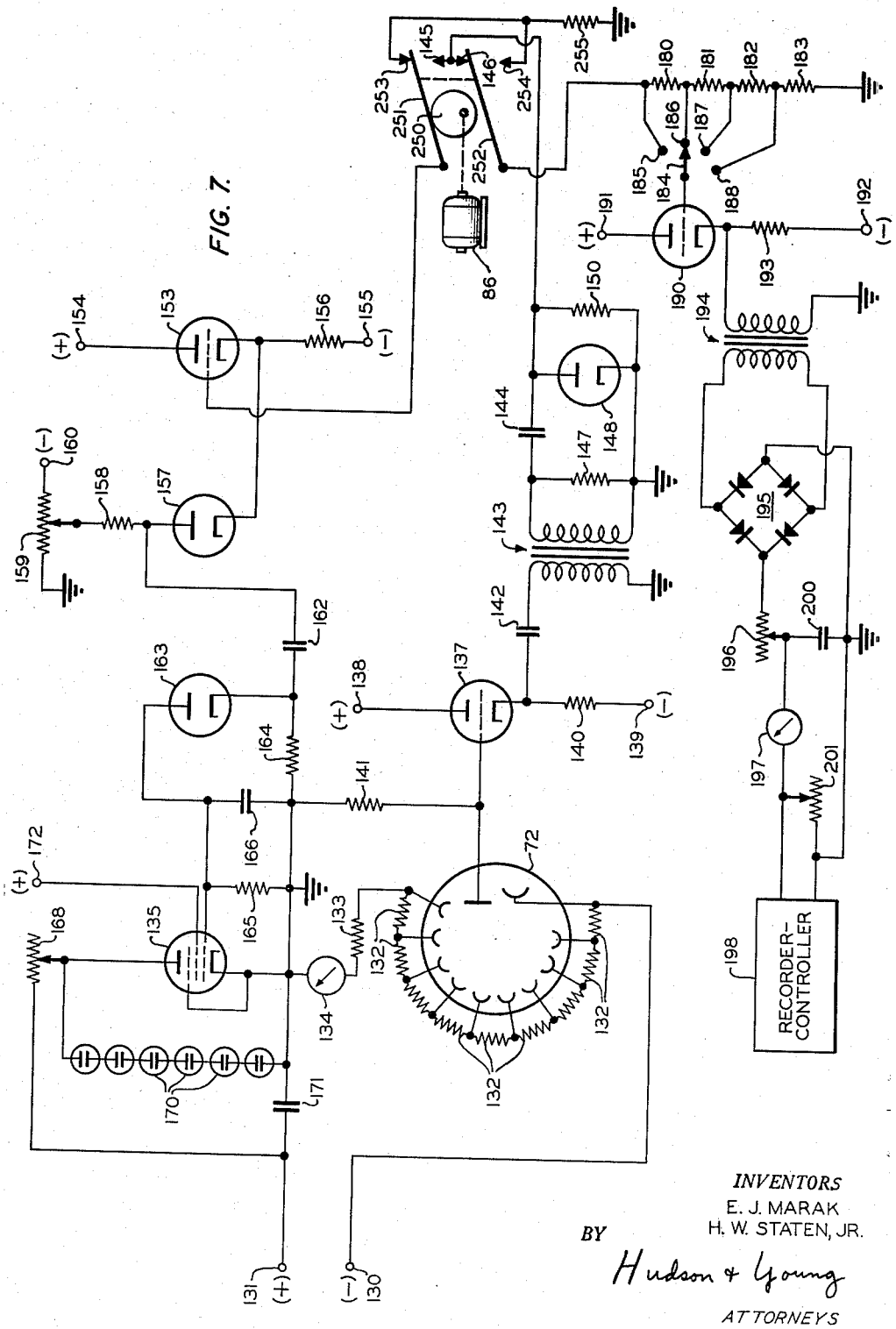

INVENTORS
E. J. MARAK
H. W. STATEN, JR.
BY
Hudson & Young
ATTORNEYS

Dec. 6, 1960 E. J. MARAK ET AL 2,962,926
NEPHELOMETER
Filed June 4, 1956 6 Sheets-Sheet 6

INVENTORS
E. J. MARAK
H. W. STATEN, JR.
BY Hudson & Young
ATTORNEYS

United States Patent Office 2,962,926
Patented Dec. 6, 1960

2,962,926

NEPHELOMETER

Eldon J. Marak, Dewey, and Hi W. Staten, Jr., Bartlesville, Okla., assignors to Phillips Petroleum Company, a corporation of Delaware Filed June 4, 1956, Ser. No. 589,242

10 Claims. (Cl. 88—14)

This invention relates to the detection of solids suspended in fluids by means of light scattering measurements.

In various types of chemical processes it is necessary to separate solids from fluids. One particular need for such a separation occurs in the polymerization of olefins by the use of granular catalysts. In this process it is important to separate the catalyst from the polymer in order to obtain a high purity product. The separation can be accomplished by means of conventional filters or centrifuges. In such an operation it is desirable to measure continuously the solid content of the filter effluent to be sure that the filtering means is making the desired separation.

In accordance with one aspect of the present invention, novel apparatus is provided to detect the presence of suspended solids in fluids. A beam of radiation is directed through a sample of the material to be analyzed. A portion of the beam is scattered by suspended particles in the fluid. A beam of this scattered radiation is compared with the transmitted beam to determine the concentration of the suspended particles. The comparison is accomplished by directing the two beams alternately on a radiation detector. The ratio of the scattered radiation to the transmitted radiation is a function of the solid particle concentration. The operation of the detector is regulated by the signal produced when the transmitted beam is received so that the signal of the scattered beam is independent of fluctuations in the light source.

A fluid-solids separation system can be controlled by an output signal from the analyzer of this invention. In one embodiment of this control system, the filter effluent is diverted to a disposal line whenever the solids concentrate exceeds a predetermined value. At the same time an alarm can be actuated to notify the operator. Other control systems responsive to the analyzer output signal involve transferring the material to be separated from a first filter to a second filter whenever it becomes necessary to regenerate or replace the first filter. In still another embodiment, a centrifuge is controlled by the analyzer output signal to maintain the desired separation.

Accordingly, it is an object of this invention to provide apparatus for detecting solids in fluid by means of light scattering measurements.

Another object is to provide improved apparatus for comparing radiation beams.

Other objects, advantages and features of the invention should become apparent from the following detailed description, taken in conjunction with the accompanying drawing in which:

Figure 1 is a schematic flow diagram of an olefin polymerization process having a first embodiment of a control system incorporated therein;

Figure 2 is a perspective view of the solids detector of this invention;

Figure 3 is a detailed view of the optical system of the solids detector;

Figure 4 is a view taken along line 4—4 in Figure 3;

Figure 5 is a view of the chopper which is rotated in the transmitted and scattered beams of radiation of the detector of Figure 3;

Figure 6 is a schematic representation of the air purge and water cooling system of the detector;

Figure 7 is a schematic circuit diagram of the electrical components of the radiation comparing means;

Figure 8:
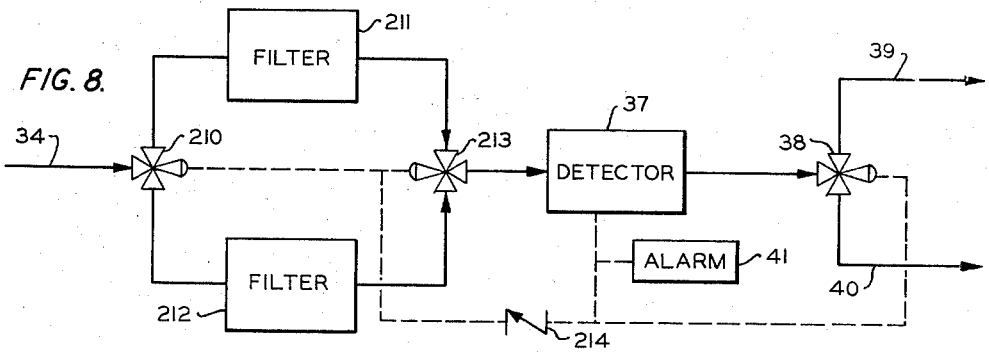
Figures 8, 9, 10 and 11 are schematic representations of additional embodiments of the fluid-solids separation control system.

Referring now to the drawing in detail and to Figure 1 in particular, there is shown a reactor 10 which is provided with an agitator or stirrer 11 that is rotated by a motor 12. A feed conduit 13 communicates with reactor 10 to supply olefins to be polymerized. A granular catalyst is introduced into reactor 10 through a conduit 14. A suitable solvent is introduced into the reactor through a conduit 15. In some operations, the catalyst can be dissolved in the solvent and supplied through the same conduit. Reactor 10 is equipped with a jacket 16 through which a cooling fluid is circulated by means of an inlet conduit 17 and an outlet conduit 18.

The effluent product polymer is withdrawn from reactor 10 through a conduit 20 which has a heater 21 therein. The purpose of heater 21 is to maintain the effluent at a sufficiently high temperature so that the polymer remains dissolved in the solvent. Conduit 20 communicates with a flash chamber 22. The polymer is removed from chamber 22 through a conduit 23. The vapor stream comprising the unreacted olefin is removed from the top of chamber 22 through a conduit 24 which has a condenser 25 therein. Conduit 24 communicates with a separator 26. The unreacted olefin vapors are removed from the top of separator 26 through a conduit 27. Any condensed material is returned to chamber 22 through a conduit 30 which has a heater 31 therein.

A conduit 32 communicates with conduit 23 to supply additional solvent to the reaction product to ensure that the polymer remains in solution. A heater 33 is incorporated in conduit 23. The resulting mixture of product and solvent is directed to the inlet of a fluid-solids separator 35, which can be a filter or centrifuge, for example. The solids-free effluent from separator 35 is directed by a conduit 36 to the inlet of the solids detector 37 of this invention. From detector 37 the stream passes to the inlet of a two-way valve 38. The inlet of valve 38 normally is in communication with an outlet conduit 39 which delivers the product to a storage tank, not shown. A second conduit 40 communicates with valve 38 so as to remove the product to a disposal tank whenever valve 38 is actuated by a signal from detector 37. Whenever the measured solids content exceeds a predetermined value, valve 38 is operated in this manner. An alarm 41 is also energized to indicate that the product is no longer of the desired purity.

While the control system of this invention is applicable generally to any fluid-solids separation process, it is particularly applicable to the described polymerization process which involves the polymerization of 1-olefins containing no more than 8 carbon atoms per molecule and having no branching nearer the double bond than the 4-position. This polymerization can be performed by the use of a catalyst comprising chromium oxide supported on a base of silica, alumina or silica-alumina. As a specific example of this reaction, ethylene is supplied to reactor 10 at the rate of approximately 14.6 cubic feet per hour. One gallon of isooctane is supplied to the reactor in the same time. The catalyst is supplied at such a rate as to maintain from 0.1 to 0.5 weight percent catalyst in the effluent removed through conduit 20. Reactor 10 is maintained at a temperature of approximately 285° F. and at a pressure of approximately 500 pounds per square inch gage. The reactor effluent normally contains approximately 0.3 weight percent catalyst, 6.5 weight percent polyethylene, 6.5 percent ethylene, 0.7 weight percent light gaseous impurities and 86.0 weight percent solvent. The effluent is heated to approximately 325° F. by heater 21. A pressure of 100 pounds per square inch gage is maintained in chamber 22, and a pressure of 90 pounds per square inch gage is maintained in separator 26. The effluent from condenser 25 enters separator 26 at a temperature of 100° F.

Under these conditions, the bottoms product from chamber 22 contains 0.3 weight percent catalyst, 6.9 weight percent polymer, 1.1 weight percent ethylene, 0.1 weight percent light gaseous impurities and 91.6 weight percent solvent. Gas is removed from separator 26 through conduit 27 at a rate of approximately 6.7 cubic feet per unit time. This gas has a composition of 81 weight percent ethylene, 10 weight percent solvent and 9 weight percent light gaseous impurities.

It is to be understood, however, that the polymerization process is not limited to the specific example herein described. In some applications, diolefins and conjugated diolefins of no more than 8 carbon atoms per molecule can be polymerized. Other polymerization catalysts can be employed in some operations; and other bases, such as thoria and zirconia, can be employed. Suitable solvents include aliphatic and alicyclic hydrocarbons having 3 to 12 carbon atoms per molecule, and more particularly such hydrocarbons having 5 to 12 carbon atoms per molecule. Examples of such solvents include propane, normal butane, cyclohexane and methylcyclohexane. Furthermore, the reaction temperatures, pressures and feed rates can be varied. The 1-olefins described herein can be polymerized at temperatures in the range of 150 to 450° F. and at pressures varying up to 700 pounds per square inch gage, or even higher in some instances. Temperatures in the range of 275 to 375° F. are preferred for ethylene, and temperatures in the range of 150 to 250° F. are preferred for propylene. Mixtures of 1-olefins can also be polymerized.

Detector 37 is illustrated in detail in Figures 2, 3, 4, and 5. The optical and electrical components of the analyzer are mounted on a base plate 50 which is contained within an explosion-proof cylinder 51. Cylinder 51 is bolted to a front panel 52 which is maintained in an upright position by a frame 53. A rod 54 is attached to cylinder 51 and rests on support bars 55. A sample of the stream to be analyzed enters cylinder 51 through a conduit 58 which extends through panel 52. Conduit 58 communicates with a passage 56 formed in a metal block 57. The outlet of passage 56 communicates with conduit 58 which extends through panel 52 to remove the sample stream from passage 56. It is important that the sample stream be maintained at an elevated temperature in order to retain the polymer in solution. A plurality of heating elements 60 are mounted in block 57 for this purpose. These heating elements are regulated by a thermostat 61 which maintains the desired temperature. Block 57 preferably is surrounded by a mass of heat insulating material 62.

Block 57 is provided with a second passage 64 which communicates with passage 56 at right angles thereto. A beam of radiation is directed through passage 64 and through the sample fluid circulated through passage 56. This radiation beam is produced by a light source 65 which is mounted in a housing 66. Radiation from source 65 is collimated by a lens 67 and passed through an aperture 68 so that a narrow beam is directed through passage 64. The radiation transmitted through passage 64 and the fluid sample is reflected by a prism 70 to impinge upon a radiation detector 72, such as a photomultiplier tube. Prism 70 is mounted in a housing 71 and detector 72 is mounted in a housing 73. One or more attenuators 75 are positioned in the beam to reduce the intensity. A portion of the radiation beam directed through passage 56 is scattered by the solid particles entrained in the sample fluid and emerges from block 57 through a passage 77. A window 78 prevents leakage of fluid from passage 77. This scattered radiation beam is focused by lenses 80 and 81 through an aperture 82. The beam transmitted through aperture 82 is focused by lens 83 on detector 72.

A chopper disc 85 is rotated in the two radiation beams at a predetermined speed by means of a motor 86. This disc, which is illustrated in detail in Figure 5, is provided with an annular slot 87 which extends nearly 180° so that each radiation beam is alternately blocked by and transmitted through the disc. Detector 72 thus receives radiation from the two beams alternately. A mechanical switch 90 is also actuated by a motor 86 so that the output signal from detector 72 is connected to one of the two circuits depending upon which beam is received by the detector. The operation of this switch is described in detail hereinafter. Switch 90 and the electrical components associated therewith are mounted in a housing 91.

In order to maintain the operation of the optical and electrical components of the analyzer uniform, it is necessary that these components not be overheated. This is accomplished by circulating a cooling fluid, such as water, through cylinder 51. The cooling water enters cylinder 51 through panel 52 and is directed by a conduit 93 to housing 73. The water circulates through a passage in housing 73 and is directed therefrom through a conduit 94 to housing 66. The water circulates through a conduit in housing 66 and is then directed through a conduit 95 to housing 91. The water circulates through a conduit in housing 91 and is then directed through a conduit 96 to housing 71. The water circulates through a conduit in housing 71 and is vented through a conduit 97 which passes out of cylinder 51 through panel 52. This circulating water prevents the analyzer from being elevated in temperature from the hot fluid in block 57.

It is also desired to prevent the accumulation of hydrocarbon vapors in cylinder 51 from possible leaks in the sample system. This is accomplished by circulating air through cylinder 51 to purge any hydrocarbon vapors from the cylinder. The apparatus illustrated in Figures 2 and 6 is provided to supply filtered, moisture-free air for this purpose. Air is supplied to the inlet of an upright tube 100 through a conduit 101 which has a pressure regulator 102 and a pressure gage 103 therein. Tube 100 has a coil 105 positioned in the upper portion thereof. Cooling water is supplied to the inlet of coil 105 by a conduit 106. This water is removed from coil 105 through a conduit 107 which communicates with water inlet conduit 93 in cylinder 51. The air which enters tube 100 from conduit 101 passes upwardly past coil 105 and is removed from the top of the tube through a conduit 110 which has a pressure regulator 111 and a pressure gage 112 therein. Any condensible vapors in the air are condensed by contact with coil 105 and settle to the bottom of tube 100 to form a column of liquid. This liquid column is transmitted by a passage 114 to the lower side of a diaphragm 115. Diaphragm 115 normally is urged by a spring 116 to a position which blocks an outlet passage 117. It should be evident that as the column of liquid increases in height the pressure exerted on the underside of diaphragm 115 is increased so that passage 117 is opened to vent excessive liquid from tube 100. The air pressure in tube 100 is applied to the upper side of diaphragm 115 by means of a conduit 120. Air is removed from tube 100 through conduit 110 passes through a filter 121 which removes any solid materials. The air then passes through a desiccant 122 and a flow regulator 123 before entering cylinder 51. This air enters cylinder 51 through an inlet port 125 and is vented through an outlet port 126 which has an explosion-proof vent therein.

The electrical circuit associated with photomultiplier tube 72 is illustrated in Figure 7. The cathode of tube 72 is connected to a potential terminal 130 which is negative with respect to a second potential terminal 131. A resistor 132 is connected between the cathode of tube 72 and the adjacent dynode. Similar resistors are connected between the other adjacent dynodes. The dynode adjacent the anode is connected through a resistor 133 and a current meter 134 to ground. The anode of tube 72 is connected to the control grid of a triode 137. The anode of triode 137 is connected to a positive potential terminal 138, and the cathode of triode 137 is connected to a negative potential terminal 139 through a resistor 140. The control grid of triode 137 is connected to ground through a resistor 141. The cathode of triode 137 is also connected through a capacitor 142 to the first terminal of the primary winding of a transformer 143. The second terminal of the primary winding is connected to ground. The first terminal of the secondary winding of transformer 143 is connected through a capacitor 144 to first switch contacts 145 and 146. The second terminal of the secondary winding of transformer 143 is connected to ground. A resistor 147 is connected in parallel with the secondary winding of transformer 143. The anode of a diode 148 is connected to switch 145. The cathode of diode 148 is connected to ground. A resistor 150 is connected in parallel with diode 148.

Motor 86 rotates a cam 250 between switch blades 251 and 252. This moves blades 251 and 252 into engagement with respective contacts 145 and 146 alternately. Blade 251 engages a contact 253 when blade 252 engages contact 146, and blade 252 engages a contact 254 when blade 251 engages contact 145. Contacts 253 and 254 are connected to ground through a resistor 255. The blades engage each of their contacts during approximately one-half of a cycle of rotation of cam 250. Blade 251 is connected to a servo compensating circuit to alter the gain of 72, and specifically is connected to the control grid of a triode 153. The anode of triode 153 is connected to a positive potential terminal 154, and the cathode of triode 153 is connected to a negative potential terminal 155 through a resistor 156. The cathode of triode 153 is also connected to the cathode of a diode 157. The anode of diode 157 is connected through a resistor 158 to the contactor of a potentiometer 159. One end terminal of potentiometer 159 is connected to ground, and the second end terminal is connected to a negative potential terminal 160. The anode of diode 157 is connected through a capacitor 162 to the cathode of a diode 163. The anode of diode 163 is connected to the control grid of pentode 135. The cathode of diode 163 is connected to ground through a resistor 164.

A resistor 165 and a capacitor 166 are connected in parallel with one another between the control grid of pentode 135 and ground. The anode of pentode 135 is connected through a variable resistor 168 to terminal 131. A number of series connected gas-filled discharge tube 170 are connected between the anode of pentode 135 and ground. A capacitor 171 is connected between terminal 131 and ground. The screen grid of pentode 135 is connected to a positive potential terminal 172, and the suppressor grid of pentode 135 is connected to the cathode thereof. The cathode of pentode 135 is connected to ground.

Blade 252 is connected to ground through series connected resistors 180, 181, 182 and 183. A gain selector switch 184 is adapted to engage terminals 185, 186, 187 and 188 selectively. Switch 184 is operated by an arm 184a, see Figure 2. Terminal 185 is connected to blade 252; terminal 186 is connected to the junction between resistors 180 and 181; terminal 187 is connected to the junction between resistors 181 and 182; and terminal 188 is connected to the junction between resistors 182 and 183. Switch 184 is connected to the control grid of a triode 190. The anode of triode 190 is connected to a positive potential terminal 191, and the cathode of triode 190 is connected to a negative potential terminal 192 through a resistor 193. The cathode of triode 190 is also connected to one end terminal of the primary winding of a transformer 194. The second end terminal of the primary winding is connected to ground. The secondary winding of transformer 194 is connected across first opposite terminals of a full wave rectifier bridge 195. The third terminal of bridge 195 is connected through a variable resistor 196 and a current meter 197 to the first input terminal of a recorder-controller 198. The fourth terminal of bridge 195 is connected to ground. A capacitor 200 is connected between ground and the junction between resistor 196 and meter 197. A variable resistor 201 is connected between ground and the junction between meter 197 and the first input terminal of recorder-controller 198. The second input terminal of recorder-controller 198 is connected to ground.

Cam 250 is synchronized with chopper disc 85 so that switch blade 251 engages contact 145 when the radiation beam reflected from prism 70 impinges upon tube 72. Switch blade 252 engages contact 146 when the scattered radiation beam is directed upon tube 72. The ratio of the scattered beam to the transmitted beam is a function of the solid particles in the fluid sample. When the scattered beam impinges upon tube 72, the output signal therefrom is applied through cathode follower 137, transformer 143 and switch blade 252. Diode 148 serves as a negative clamp. The signal is applied from switch blade 252 through cathode follower 190 and transformer 194 to rectifier 195. The rectified signal is filtered by resistor 196 and capacitor 200 and applied to the input of recorder-controller 198. The amplitude of this signal is a function of the solid particles in the fluid sample.

It is desired to maintain the reference beam (65—70—72) signal relatively constant. Variations in this can be caused by changes in turbidity and by fluctuations in intensity of the light beam emitted from source 65. Compensation is accomplished when the transmitted beam is alternately directed upon tube 72. During these half cycles, the output signal from tube 72 is applied through switch blade 251 to the input of cathode follower 153. The output of cathode follower 153 is transmitted through a clipper 157 and a bias rectifier 163 to the control grid of pentode 135. If the transmitted beam should increase in intensity, the magnitude of the negative potential applied to the control grid of pentode 135 is increased to decrease conduction therethrough. This results in the dynode potentials of tube 72 becoming less negative so that the gain of the tube is diminished by an amount sufficient to compensate for the original change in intensity of the radiation beam. If the radiation beam should decrease in intensity, the potentials are changed in the reverse manner to increase the net gain of the photomultiplier tube. Thus, the output signal applied to recorder-controller 198 is representative solely of the solid particles of the fluid sample. Instrument 198 can be a conventional potentiometer-controller wherein an input electrical signal is converted into a corresponding output pneumatic pressure.

Figure 12:
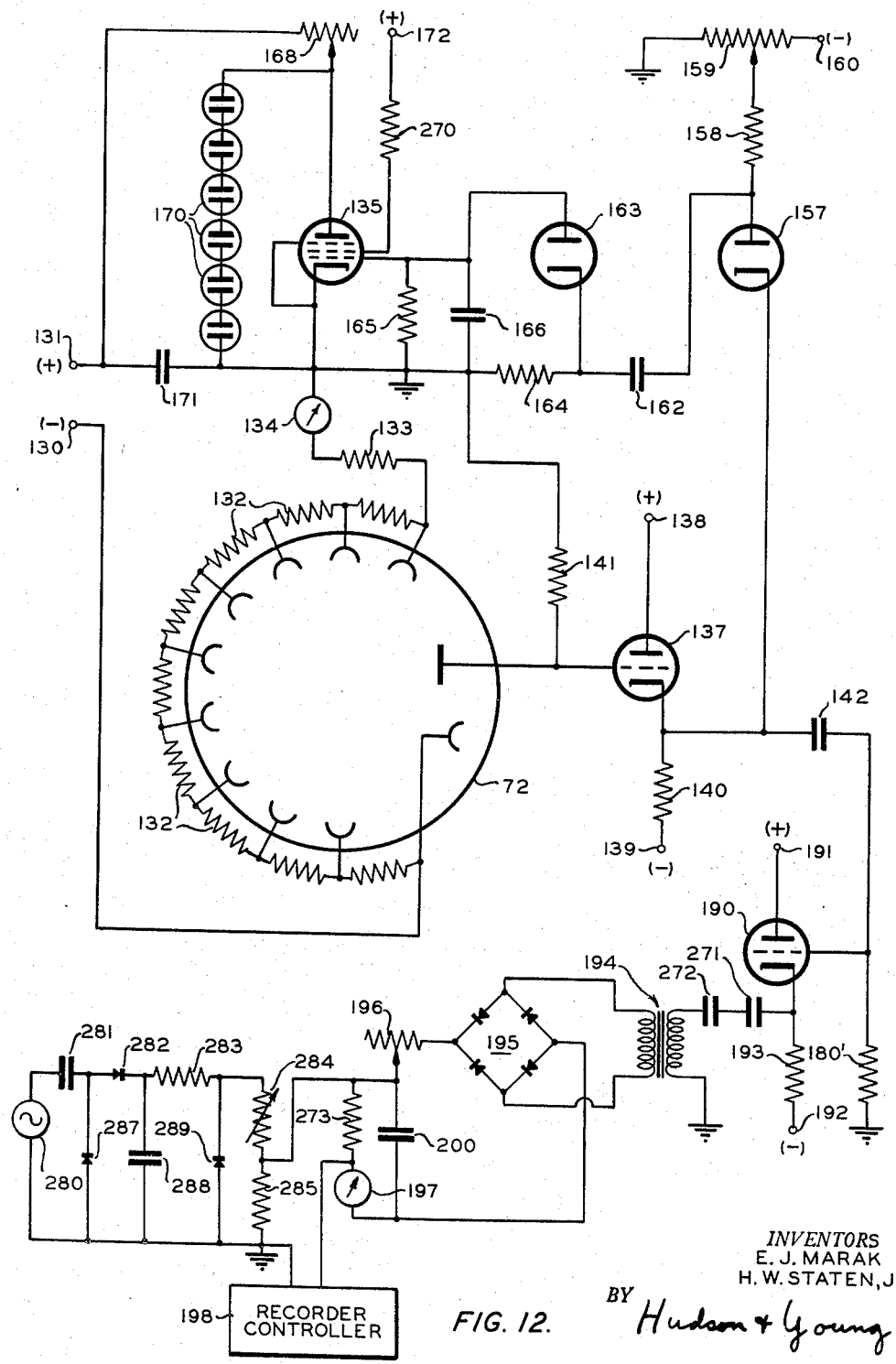
Figure 12 is a modified form of comparing circuit.

A simplified form of control circuit is shown in Figure 12. This circuit is generally similar to that of Figure 7 and corresponding elements are designated by like reference numerals. The principal difference is that the switch driven by motor 86 is eliminated in Figure 12. The cathode of triode 137 is connected directly to the cathode of diode 157. The cathode of triode 137 is connected through a capacitor 142 to the control grid of triode 190. Triode 190 is provided with a single grid resistor 180'. The cathode of triode 190 is connected through a pair of series connected electrolytic capacitors 271 and 272 to the first terminal of the primary winding of transformer 194. The contactor of variable resistor 196 is connected through a resistor 273 to one terminal of recorder 198 and through a resistor 285 to ground. One terminal of a source of alternating current 280 is connected through a capacitor 281, a rectifier 282, a resistor 283, a variable resistor 284 and resistor 285 to ground. The second terminal of source 280 is connected to ground. A rectifier 287 is connected between ground and the junction between capacitor 281 and rectifier 282. A capacitor 288 is connected between ground and the junction between rectifier 282 and resistor 283. A rectifier 289 is connected between ground and the junction between resistors 283 and 284. A.C. voltage thus appears across resistors 284 and 285.

The output signal from tube 72 varies in magnitude at the frequency chopper 85 is rotated. The magnitude of this difference is measured by recorder-controller 198 to provide an indication of the scattered light. This signal is subtracted from the reference D.C. voltage across resistors 284 and 285 so that recorder 198 reads "up scale" with an increase in turbidity of the sample being measured. The transmitted beam is of greater magnitude than the scattered beam. Thus, the greatest output signal from tube 72 is representative of the reference transmitted beam. This signal is, in effect, compared with the bias voltage at terminal 160. Any change in the reference output signal from tube 72 thus actuates the servo compensating circuit previously described in conjunction with Figure 7. The initial relative intensities of the light beams can be adjusted by light trimmers, not shown.

In Figure 8 there is shown a second embodiment of the control system of this invention. The product conduit 34 communicates through a three-way valve 210 with the inlet of either a filter 211 or a filter 212. The outlets of the two filters communicate with a three-way valve 213 with the inlet of detector 37. It is assumed that valves 210 and 213 initially are opened so that the product passes through filter 211. The product stream flows in this direction until such time as the solid content may exceed a predetermined limit. At this time, the output signal from detector 37 reverses valve 38 so as to direct the product stream into disposal line 40. Valves 210 and 213 are also operated to divert the product stream through a fresh filter 212. When the indicated solids content decreases to an acceptable value, the operation of valve 38 is reversed to again divert the product to the storage conduit 39. If the control system operates by pneumatic pressure, as indicated, a check valve 214 can be incorporated in the control line to valves 210 and 213 to prevent the product flow from reverting back to filter 211. An alarm 41 is actuated by detector 37 to notify the operator that filter 211 needs to be replaced or reconditioned.

Figure 9:
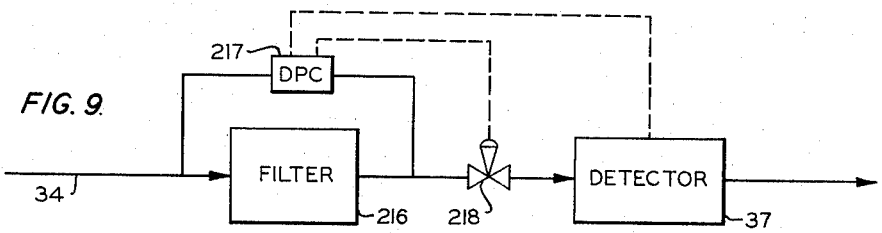

In Figure 9 there is shown a third embodiment of the control system. In this system the polymer product is directed at all times through a filter 216. The operation of filter 216 normally is controlled by a differential pressure controller 217 which adjusts a valve 218 to regulate the flow rate through filter 216. If the pressure differential should become too high so that excessive solid particles pass through the filter, these particles are indicated by the detector. The output signal from detector 37 then overrides pressure controller 217 to reduce the pressure differential. Storage and disposal conduits, such as 39 and 40 of Figure 8, can be connected to the outlet of detector 37 of Figure 9 if desired.

Figure 10:
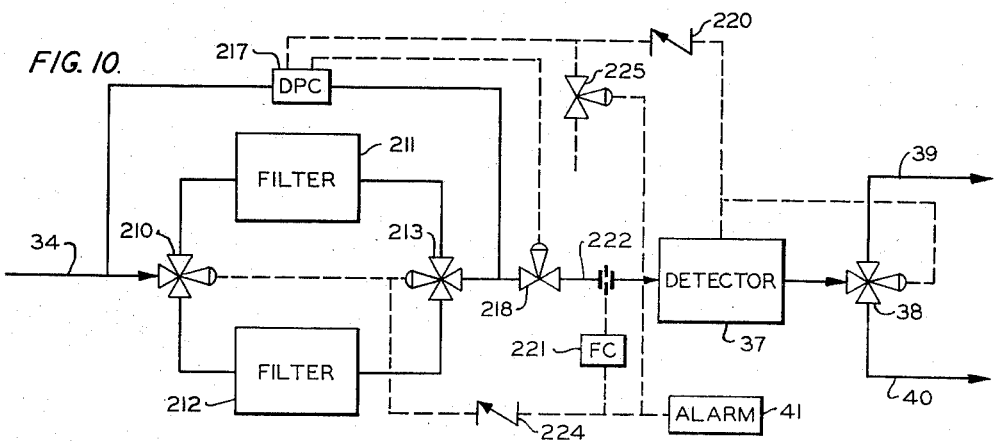

The control system of Figure 10 combines features of the control systems of Figures 8 and 9. In the system of Figure 10, the flow through either of the filters 211 and 212 normally is controlled by the differential pressure controller 217 which adjusts valve 218. It is assumed that the flow initially is through filter 211. If the indicated solids content should exceed a predetermined limit, the output signal from detector 37 diverts the flow to disposal conduit 40 and resets pressure controller 217 to reduce the rate of flow through filter 211. A check valve 220 prevents the flow from again increasing after this initial adjustment. A flow controller 221 is connected in the conduit 222 which communicates between valve 213 and detector 37. Whenever the flow decreases below a set value, an output air pressure from controller 221 is applied through a check valve 224 to operate valves 210 and 213. This diverts the flow through the fresh filter 212. At the same time, the output signal from flow controller 221 operates a pulse valve 225 to vent the reset pressure initially supplied to controller 217. This permits the flow through filter 212 initially to assume a desired high value. An alarm 41 is actuated by controller 221 to notify the operator that filter 212 has been placed in operation.

Figure 11:
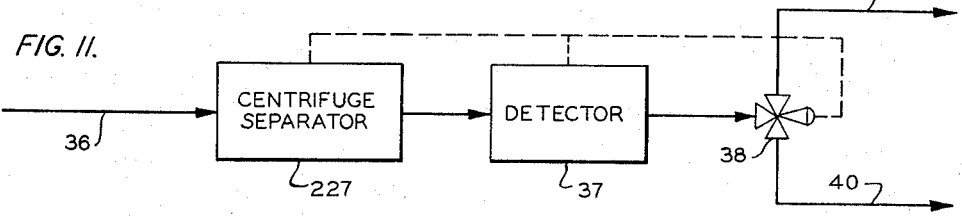

In Figure 11 there is shown a modified form of control system which employs a centrifuge separator in place of the filter. The operation of separator 227 is controlled by the output signal of detector 37 to maintain the desired separation at all times. For example, the flow rate through the separator can be decreased if it becomes necessary to remove larger amounts of solids. A second alternative comprises adjusting the overflow to underflow rate in the separator to maintain the desired separation. These control steps are performed by the output signal from detector 37.

From the foregoing description it should be evident that various configurations of control systems can be employed in the fluid-solids separation step of the described polymerization process. It should be evident, however, that these control systems are applicable to any fluid-solids separation. An improved nephelometer is also provided in accordance with this invention. While the invention has been described in conjunction with present preferred embodiments, it should be evident that it is not limited thereto.

What is claimed is:

1. A nephelometer comprising a sample cell, a source of radiation, means to direct a beam of radiation from said source into said cell, a means to detect and amplify radiation, means to direct that part of the radiation transmitted through said cell from said beam to said means to detect and amplify as a first beam, means to direct that part of the radiation scattered from the first mentioned beam within said cell to said means to detect and amplify as a second beam, means to block said first and second beams alternately, means to measure radiation impinging upon said means to detect and amplify from said second beam, and means responsive to said first beam impinging upon said means to detect and amplify to control the gain of said means to detect and amplify in an inverse proportion to the ratio of intensities between successive first beams.

2. The combination in accordance with claim 1 wherein said means to detect and amplify comprises a photoelectric tube, and wherein said means to control comprises means to vary the operating potentials on said tube.

3. The combination in accordance with claim 1 wherein said means to detect and amplify comprises a photomultiplier tube, and wherein said means to control comprises means to vary the potentials applied to the dynodes of said tube relative to the potential applied to the cathode of said tube.

4. A nephelometer comprising a sample cell; a source of radiation; means to direct a single beam of radiation from said source into said cell; a photomultiplier tube; means to direct radiation from said single beam that is transmitted through said cell to said tube as a first beam and means to direct radiation from said single beam that is scattered from said cell to said tube as a second beam, said first beam being of greater intensity than said second beam; means to block said first and second beams alternately; means to measure the difference between the output signals of said tube when said first and second beams impinge thereon; and means responsive to the maximum output signal of said photomultiplier tube to control the operating voltages applied to said tube so that the effective gain of said tube is varied inversely with a change in said maximum output signal.

5. A nephelometer comprising a sample cell; a source of radiation; means to direct a single beam of radiation from said source into said cell; a radiation detector; means to direct radiation transmitted through said cell to said detector as a first beam and means to direct radiation scattered from said cell to said detector as a second beam, said first beam being of greater intensity than said second beam; means to block said first and second beams alternately; means to measure the output of said detector; means for connecting said detector to said means to measure; means connected to said detector to vary the response of said detector inversely to changes in said first beam; and a means to provide said means to vary with a signal that is representative of the response of said detector to said first beam.

6. The nephelometer of claim 5 wherein said means to provide includes a clipper connected between said detector and said means to vary, said clipper receiving the response of said detector to both of said first and second beams and being oppositely biased by an amount at least equal to the response of said detector to said second beam, thereby to provide said means to vary with only a clipped response to said first beam.

7. A nephelometer comprising a sample cell; a source of radiation; means to direct a beam of radiation from said source into said cell; a photomultiplier tube; means to direct radiation transmitted through said cell to said tube as a first beam, means to direct radiation scattered from said cell to said tube as a second beam, said first beam being of greater intensity than said second beam; means to block said first and second beams alternately; a first circuit to vary the gain of the tube inversely with changes of the response of said tube to said first beam and comprising a diode clipper permanently connected to the output of said tube and biased sufficiently to eliminate signals of said tube in response to said second beam, a dynode control vacuum tube having a control grid connected to receive the output of said clipper and said vacuum tube being also connected to provide a current to the dynodes of said tube; a means to measure; a second circuit permanently connecting the output of said tube to said means to measure, said second circuit comprising, a full-wave rectifier connected to the output of said tube, means for biasing said rectifier at least equally and oppositely to the least in amplitude of the rectified response of said tube to said first and second beams, and means connecting the output of said biased circuit to said measuring means.

8. The nephelometer of claim 5 wherein said means for connecting includes a transformer and a rectifier connected in series to said transformer, and further includes means connected to said transformer for applying a bias to said rectifier in opposition to the respective signals respective of the detector response to said first and second beams, said bias being equal to the least one in amplitude of such respective signals, thereby to provide said means to measure with a signal that equals the algebraic sum of said bias and the detector response to the greater in magnitude of said respective signals.

9. The nephelometer of claim 5 wherein said means for connecting said detector to said means to measure and said means connected to said detector to vary the response of said detector include switching means synchronized with said means to block so as to connect said detector to said means to measure when said second beam is received by said detector and to connect said detector to said means to vary when said first beam is received by said detector.

10. The nephelometer of claim 9 wherein said detector and said means to vary comprise a photomultiplier tube, a vacuum tube having at least an anode, a cathode and a control grid, means connecting the cathode of said vacuum tube to a point of reference potential, a direct current voltage source, means applying the negative terminal of said voltage source to the cathode of said photomultiplier tube, a resistor connected between the cathode of said photomultiplier tube and the adjacent dynode and between adjacent dynodes, means connecting the dynode adjacent the anode of said photomultiplier tube to said point of reference potential, means connected through said switching means to respond to the potential on the anode of said photomultiplier tube to apply a potential to the control grid of said vacuum tube which varies as a direct function of the potential on the anode of said photomultiplier tube; and wherein said means to measure is connected through said switching means to respond to the potential on the anode of said photomultiplier tube.

References Cited in the file of this patent

UNITED STATES PATENTS

| | | |
|---|---|---|
| 1,717,702 | Exton | June 18, 1929 |
| 2,301,367 | Cahusac et al. | Nov. 10, 1942 |
| 2,474,098 | Dimmick | June 21, 1949 |
| 2,528,924 | Vassy | Nov. 7, 1950 |
| 2,547,212 | Jamison et al. | Apr. 3, 1951 |
| 2,583,143 | Glick | Jan. 22, 1952 |
| 2,673,297 | Miller | Mar. 23, 1954 |
| 2,858,727 | Stamm et al. | Nov. 4, 1958 |

OTHER REFERENCES

"The Design of an Optical System for the Absolute Measurement of Turbidity," Journal of the Optical Society of America, Kremen et al., vol. 44, June 1954, pages 500, 501.